(12) United States Patent
Oshima (10) Patent No.: US 7,654,517 B2
(45) Date of Patent: Feb. 2, 2010

(54) IMAGE SCANNING APPARATUS AND IMAGE SCANNER

(75) Inventor: Osamu Oshima, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 107 days.

(21) Appl. No.: 12/018,862

(22) Filed: Jan. 24, 2008

(65) Prior Publication Data

US 2008/0224392 A1 Sep. 18, 2008

(30) Foreign Application Priority Data

Mar. 15, 2007 (JP) ............................. 2007-067329

(51) Int. Cl.
*B65H 1/18* (2006.01)
(52) U.S. Cl. .................. 271/152; 271/153; 271/154; 271/155; 271/270; 271/147
(58) Field of Classification Search ................ 271/152, 271/153, 154, 155, 147, 162, 265.04, 270, 271/10.02, 10.03, 110
See application file for complete search history.

(56) References Cited

U.S. PATENT DOCUMENTS

| | | | | |
|---|---|---|---|---|
| 5,295,678 | A | * | 3/1994 | Lindner et al. ............... 271/152 |
| 5,397,118 | A | * | 3/1995 | Iida et al. ..................... 271/155 |
| 5,556,252 | A | * | 9/1996 | Kuster ..................... 414/796.7 |
| 6,874,780 | B2 | * | 4/2005 | Rebeaud ..................... 271/154 |

FOREIGN PATENT DOCUMENTS

| | | |
|---|---|---|
| JP | 07-157099 A | 6/1995 |
| JP | 08-002702 A | 1/1996 |
| JP | 11-091955 A | 4/1999 |
| JP | 2006-016093 A | 1/2006 |
| JP | 2007-106539 A | 4/2007 |

OTHER PUBLICATIONS

Oshima; "Image Scanning Apparatus and Image Scanner," U.S. Appl. No. 12/031,742, filed Feb. 15, 2008.
Oshima; "Image Scanning Apparatus and Image Scanner," U.S. Appl. No. 12/043,216, filed Mar. 6, 2008.
Official Communication issued in corresponding European Application No. 08001242.0, mailed on Aug. 5, 2009.

* cited by examiner

*Primary Examiner*—Patrick H Mackey
*Assistant Examiner*—Luis Gonzalez
(74) *Attorney, Agent, or Firm*—Keating & Bennett, LLP.

(57) ABSTRACT

In an image scanning apparatus, when documents on a document tray are sequentially transferred, different control steps are performed according to a scanning speed when an upper surface height of the documents is lowered thereby turning off a height detection sensor. In a low scanning speed, the document tray is elevated one time until the upper surface height becomes a target height which is higher by a predetermined distance since a height detection sensor is turned on at an inter-transfer time between completion of document transfer and start of a subsequent document transfer. In an intermediate scanning speed, the document tray is elevated little by little in each transfer of one document at the inter-transfer time until the upper surface height reaches the target height. In a fast scanning speed, the transfer of the document is tentatively interrupted, the document tray is elevated one time until the upper surface height reaches the target height, and the transfer of the document is resumed.

5 Claims, 8 Drawing Sheets

FIG. 8

IMAGE SCANNING APPARATUS AND IMAGE SCANNER

CROSS-REFERENCE TO RELATED APPLICATIONS

This application claims priority under 35 U.S.C. 119 to Japanese Patent Application No. 2007-67329, filed on Mar. 15, 2007, which application is hereby incorporated by reference in its entirety.

BACKGROUND OF THE INVENTION

1. Field of the Invention

The present invention relates to a configuration of an image scanning apparatus suitably used to place and scan a large amount of documents.

2. Description of the Related Art

For example, Japanese patent Publication Laid-Open No. 2006-16093 discloses a copying machine which includes an upper-limit position detection sensor for detecting a topmost document while being able to place plural documents on a document tray (document feeder tray). In the copying machine disclosed in Japanese patent Publication Laid-Open No. 2006-16093, when the number of documents is decreased as the documents on the document tray are fed, a control device controls a tray driving mechanism to always keep the topmost document at the same position with respect to a pickup roller according to a detection result of the upper-limit position detection sensor. Therefore, the topmost document is always located at a position where the document can be fed.

In the large-capacity image scanning apparatus as disclosed in Japanese patent Publication Laid-Open No. 2006-16093, with the increasing need for short time copying of a large amount of documents, there is a strong demand to perform high speed scanning while maintaining the scanning image quality.

However, in Japanese patent Publication Laid-Open No. 2006-16093, there is no description concerning the timing for controlling the tray driving mechanism to lift and lower the document tray. Accordingly, in Japanese patent Publication Laid-Open No. 2006-16093, when the document tray is elevated during scanning of the document, the document is possibly moved by an elevation of the document tray during transportation of the document, resulting in deterioration of the scanning image quality.

SUMMARY OF THE INVENTION

In order to overcome the problems described above, preferred embodiments of the present invention provide a document tray elevating control suitable for high speed scanning while preventing the deterioration of the scanning image quality.

A preferred embodiment of the present invention provides an image scanning apparatus including a document tray which can accommodate plural documents with the documents overlapped, an image scanning unit which scans the document, a transfer unit which transfers the document on the document tray one by one toward the image scanning unit, a lifting and lowering device which lifts and lowers the document tray, a height detection sensor which detects an upper surface height of the documents stacked on the document tray, and a control unit which controls the lifting and lowering device. In a first case of a low document scanning speed, when the height detection sensor detects that the upper surface height is lower than a predetermined height due to the transfer of a document by the transfer unit, the control unit elevates the document tray to a target height which is higher by a predetermined distance from a height at which the height detection sensor detects that the upper surface height is not lower than the predetermined height, during an inter-transfer time between completion of transferring a document and transfer of a subsequent document is started. In a second case of a fast document scanning speed, the control unit elevates the document tray at predetermined pitches in each transfer of one document during the inter-transfer time until the upper surface height reaches the target height. In a third case of an even faster document scanning speed, the control unit tentatively interrupts the transfer of the document by the transfer unit to elevate the document tray until the upper surface height reaches the target height, and then the control unit resumes the transfer of the document by the transfer unit.

Therefore, in any one of the first to third cases, the document tray is elevated during the inter-transfer time from between the completion of document transfer to the start of a subsequent document transfer. Accordingly, when the image is scanned with the image scanning unit, the document tray is kept stationary to prevent deterioration of the scanning image quality caused by the fluctuation in document transportation. In the second case, the document tray is not elevated completely all at once, but the document tray is elevated at relatively short predetermined pitches (little by little), so that the document tray can naturally be elevated during the short inter-transfer time without interrupting the transfer of the document. In the third case, the document tray is elevated after the transfer of the document is tentatively interrupted, and then the transfer of the document is resumed, so that the document tray can surely be elevated. The document tray is elevated completely all at one time or in one step while the transfer of the document is tentatively interrupted, so that the decrease in scanning efficiency by the interruption of the transfer of the document can be minimized to a low level.

In the second case of the image scanning apparatus, the control unit elevates the document tray at predetermined pitches in each transfer of one document during the inter-transfer time until the height detection sensor detects that the upper surface height is not lower than the predetermined height. When the height detection sensor detects that the upper surface height is not lower than the predetermined height, the control unit elevates the document tray at predetermined pitches in each transfer of one document during the inter-transfer time until the upper surface height is further elevated by a predetermined target elevating distance. In a determination whether or not the upper surface height is elevated by the target elevating distance, the determination is made by adding a decrease of the upper surface height due to the transfer of the document.

Therefore, even if the document tray is elevated little by little in each document transfer in the second case, the topmost document can substantially be elevated to the target height in consideration of the decrease in upper surface height caused by the transfer of the document.

In the image scanning apparatus, preferably the predetermined pitch in the second case is defined so as to be shortened as the document scanning speed is increased.

Therefore, even if the document scanning speed is increased to shorten the inter-transfer time, the predetermined pitch is also shortened as the inter-transfer time is shortened, so that the document tray can naturally be elevated little by little at the inter-transfer time.

In the image scanning apparatus, preferably a driving source is shared by the lifting and lowering device and a document transportation device for transporting the document to the image scanning unit.

Therefore, the configuration can be simplified to realize cost reduction, weight reduction, and downsizing of the image scanner. Because of the configuration in which the document tray is elevated at the inter-transfer time, a power transmission destination of the one driving source can be switched between the time of the transfer of the document and the time of the elevation of the document tray, which allows a proper balance to be achieved between the transfer of the document and the elevation of the document tray.

In accordance with another preferred embodiment of the present invention, an image scanner is provided as the image scanning apparatus.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
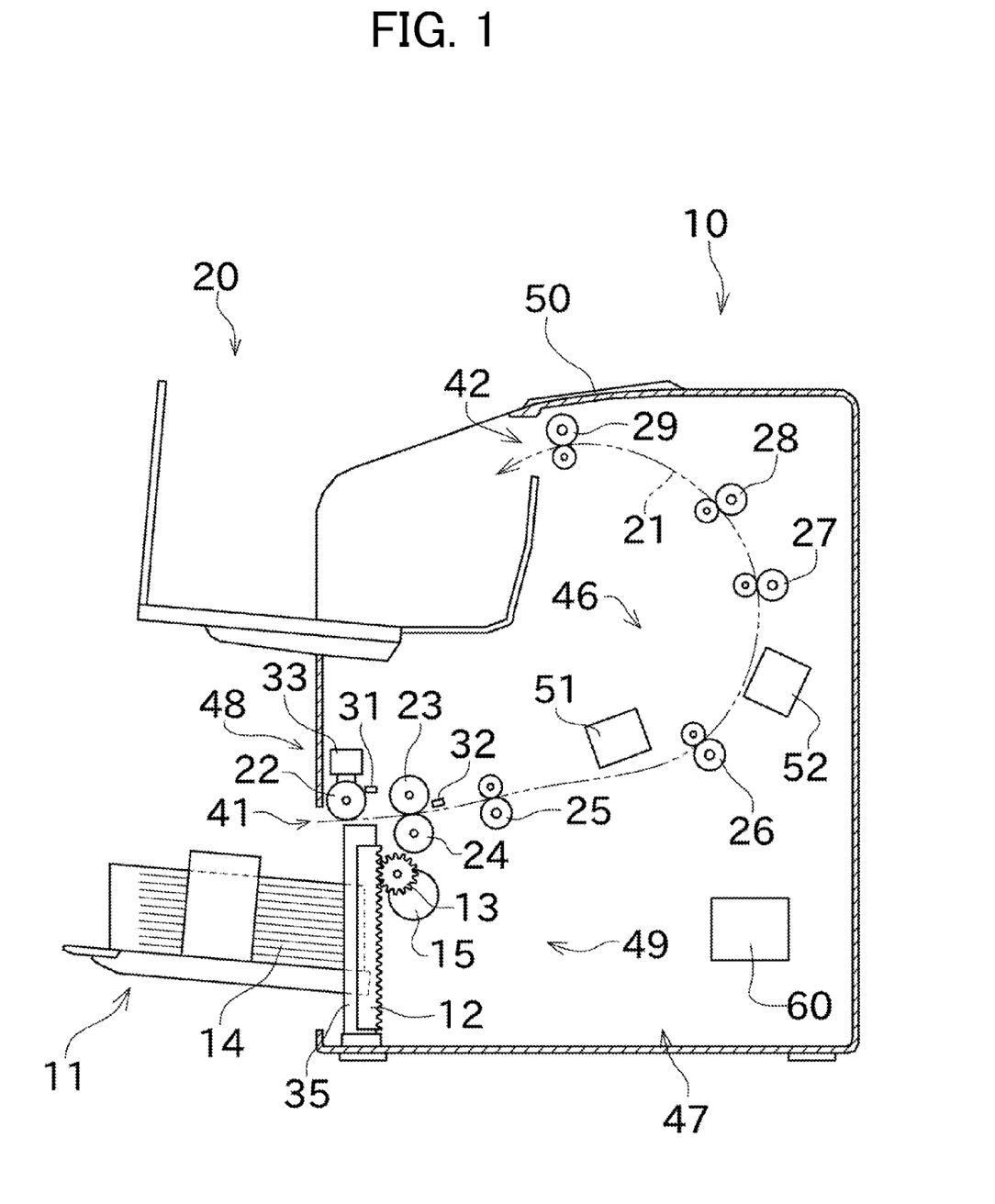
FIG. 1 is a sectional side view illustrating an entire configuration of an image scanner according to a preferred embodiment of the present invention.
Figure 2:
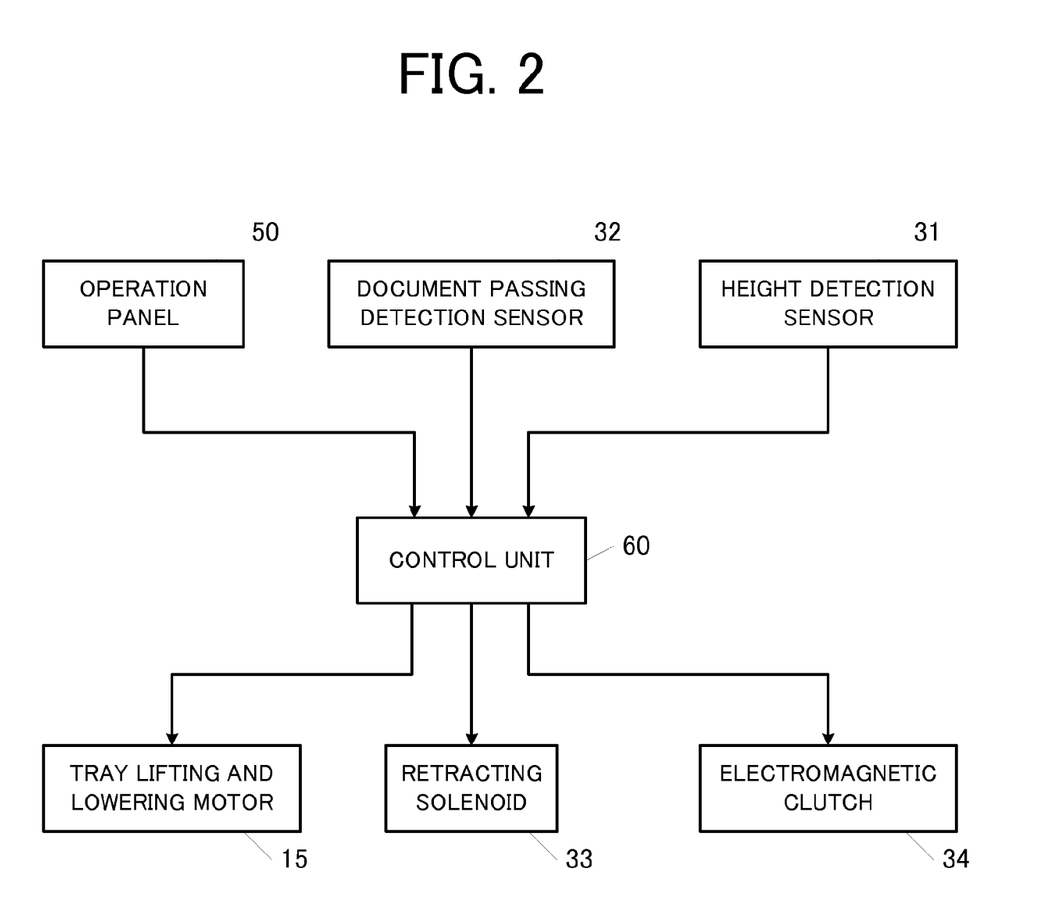
FIG. 2 is a block diagram illustrating a portion of an electronic configuration of the image scanner.
Figure 3:
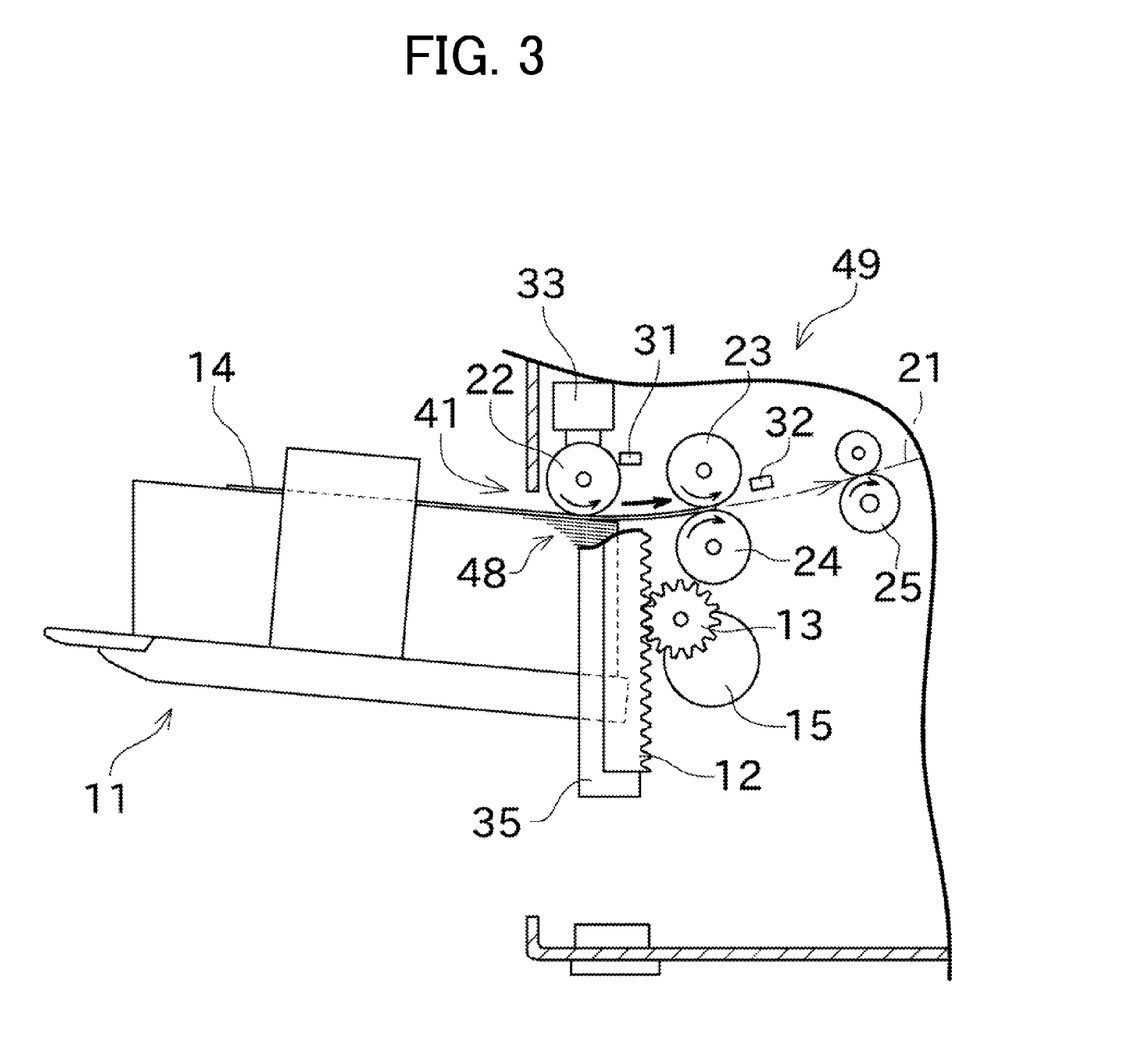
FIG. 3 is an enlarged sectional side view illustrating a state in which a transfer unit is driven to transfer a topmost document into a document transportation path.
Figure 4:
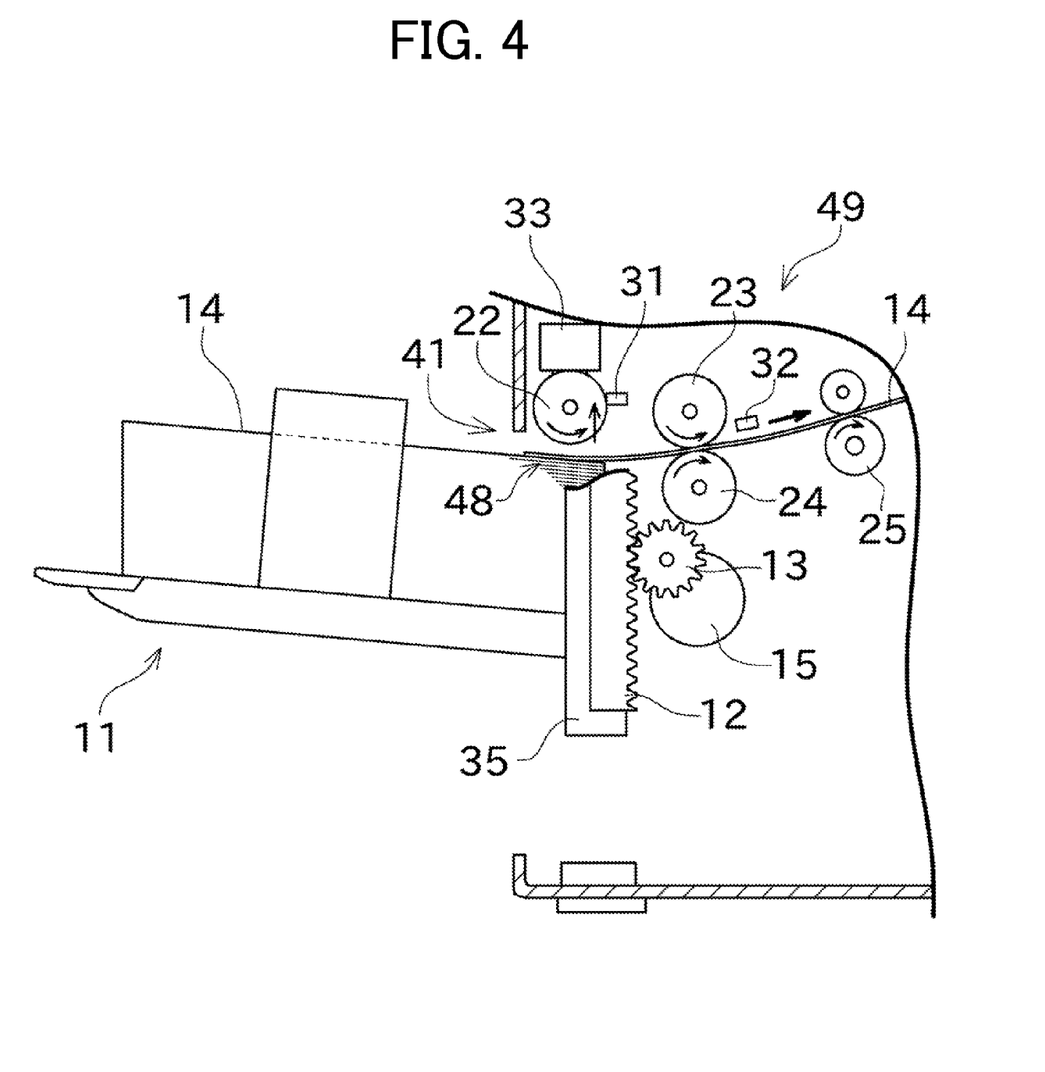
FIG. 4 is an enlarged sectional side view illustrating a state in which a pickup roller is retracted upward immediately before the transfer of the topmost document is completed.
Figure 5:
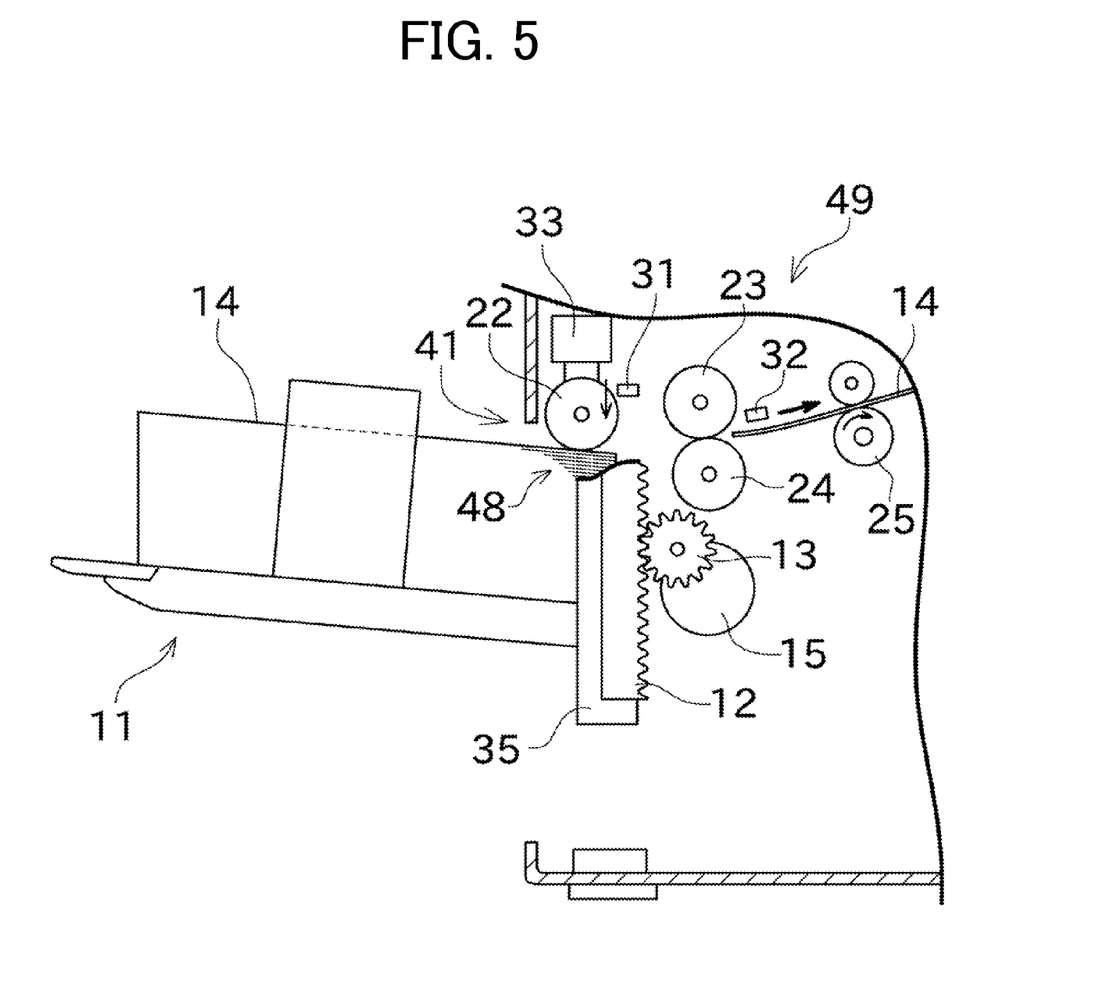
FIG. 5 is an enlarged sectional side view illustrating a state in which the transfer is completed to lower the pickup roller again.
Figure 6:
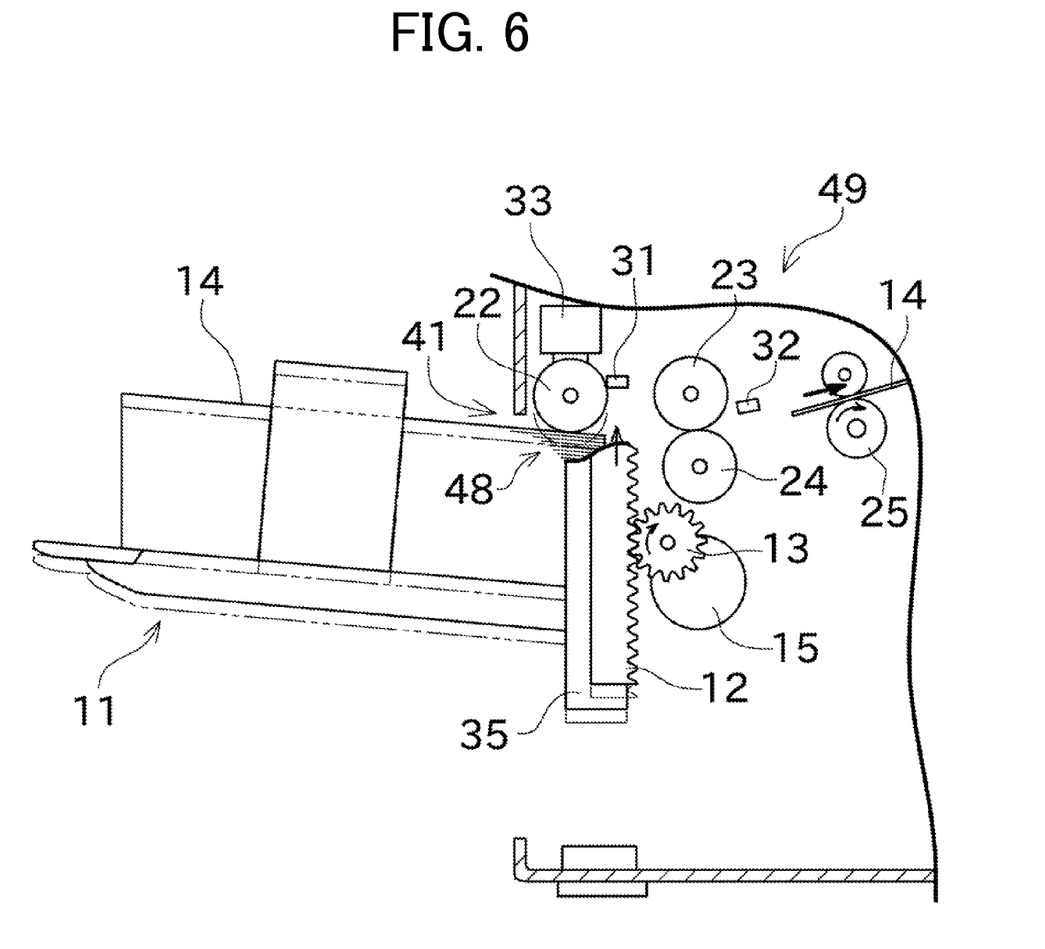
FIG. 6 is an enlarged sectional side view illustrating a state in which a document tray is elevated.
Figure 7:
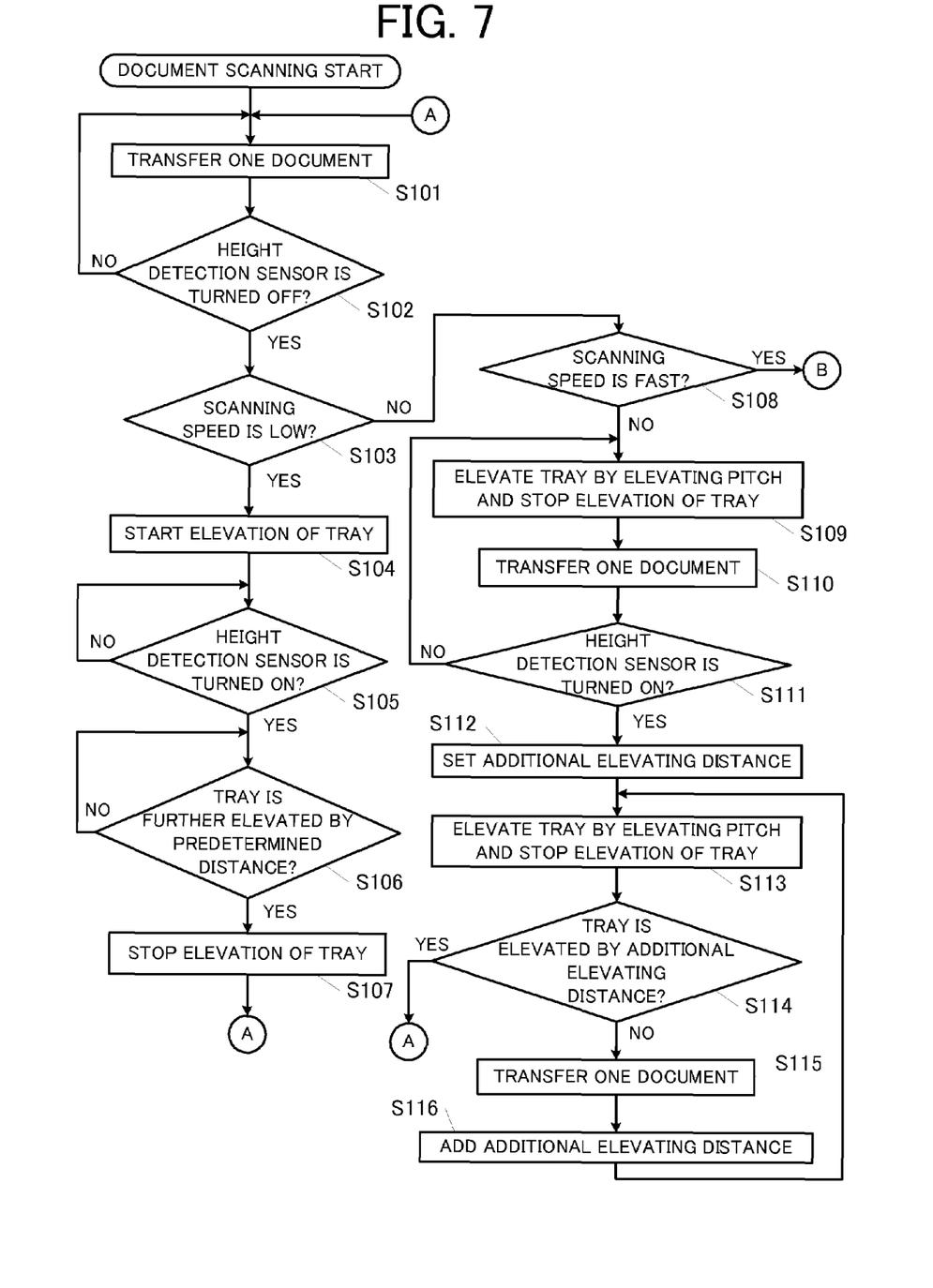
FIG. 7 is a flowchart illustrating the elevation control of the document tray (high resolution mode/intermediate resolution mode).
Figure 8:
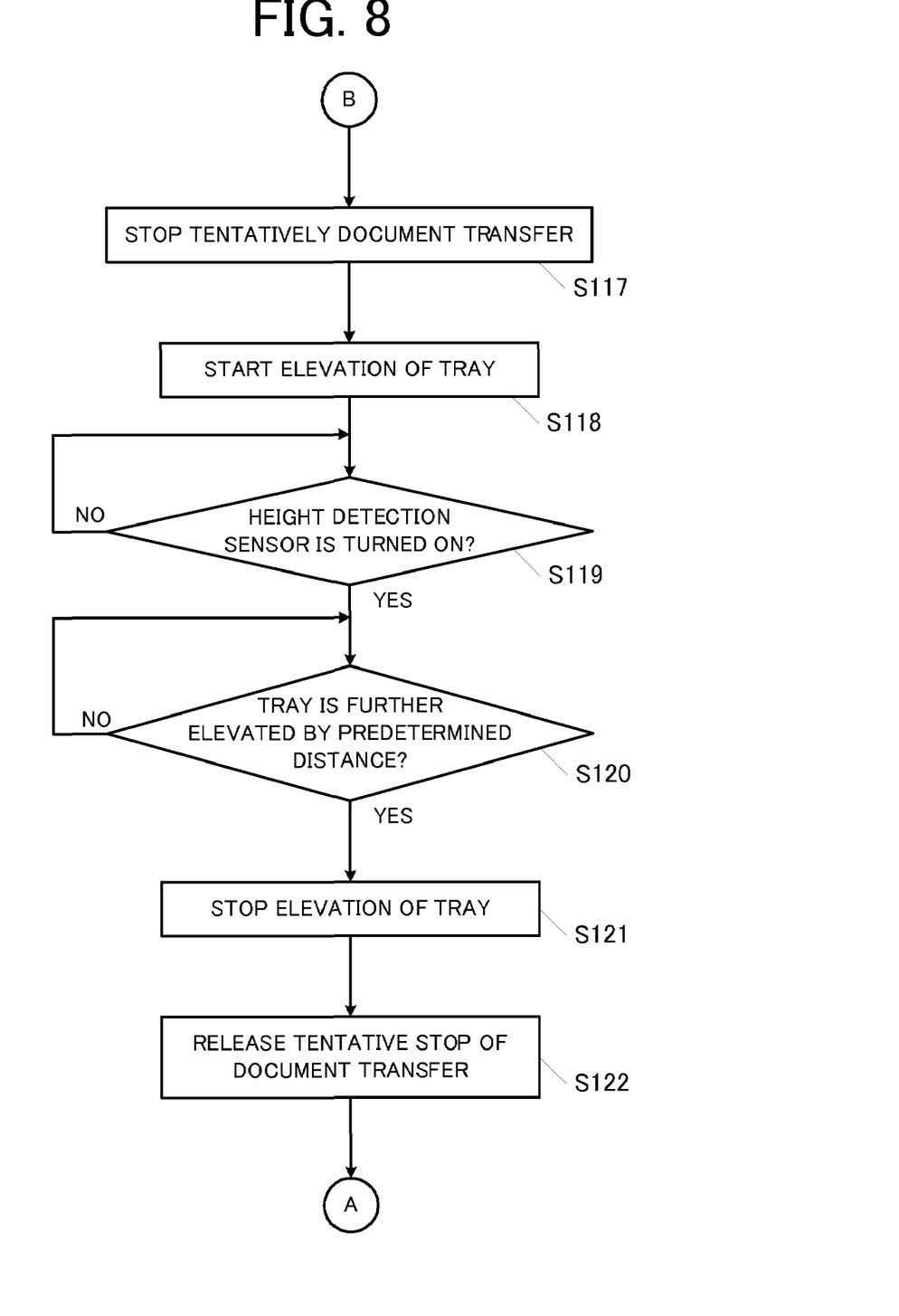
FIG. 8 is a flowchart illustrating elevation control of the document tray (low resolution mode).

Preferred embodiments of the present invention will be described below. FIG. 1 is a sectional side view illustrating an entire configuration of an image scanner according to a preferred embodiment of the present invention, and FIG. 2 is a block diagram illustrating a portion of an electronic configuration of the image scanner. FIG. 3 is an enlarged sectional side view illustrating a state in which a transfer unit is driven to transfer a topmost document into a document transportation path. FIG. 4 is an enlarged sectional side view illustrating a state in which a pickup roller is retracted upward immediately before the transfer of the topmost document is completed. FIG. 5 is an enlarged sectional side view illustrating a state in which the transfer is completed to lower the pickup roller again. FIG. 6 is an enlarged sectional side view illustrating a state in which a document tray is elevated. FIGS. 7 and 8 are flowcharts illustrating elevation control of the document tray.

As illustrated in FIG. 1, an image scanner 10 is an image scanning apparatus according to a preferred embodiment of the present invention. A large capacity document tray 11 on which documents 14 are placed is provided in a lower portion of a main body of the image scanner 10, and a discharge tray 20 in which the scanned documents 14 are stacked is provided in an upper portion of the main body of the image scanner 10.

The image scanner 10 includes a document feeding port 41 for feeding a document 14 from the document tray 11 to the inside of the main body and a document discharge port 42 for discharging the document 14 to the discharge tray 20 after an image of the document 14 is scanned inside the main body.

A curved document transportation path 21 connecting the document feeding port 41 and the document discharge port 42 is arranged in the main body of the image scanner 10, and transportation rollers 25, 26, 27, 28, and 29 are disposed along the document transportation path 21. Two image sensors 51 and 52 are disposed at a midpoint of the document transportation path 21 so as to face the front and back of the document, and the image sensors 51 and 52 scan the front and back of the document 14 passing through the document transportation path 21. An operation panel 50 is provided on a top portion of the main body of the image scanner 10. Instructions such as document scanning modes (high resolution mode/intermediate resolution mode/low resolution mode), a document scanning speed, and start/stop of image scanning can be provided to the apparatus through the operation panel 50.

The image scanner 10 includes an image scanning unit 46 which scans the document 14 and a document transportation device 47 which transports the document 14. The document transportation device 47 includes the transportation rollers 25 to 29 and an electric motor (driving source, not illustrated) which drives the transportation rollers 25 to 29. The document transportation device 47 transports the document 14 on the document tray 11 from the document feeding port 41 to the image scanning unit 46, and the document transportation device 47 discharges the document 14 from the document discharge port 42 onto the discharge tray 20 after the document 14 passes through the image scanning unit 46.

The image scanner 10 includes the document tray 11 and a transfer unit 48. The transfer unit 48 transfers and separates the documents 14 one by one, and the transfer unit 48 transports the document 14 from the document feeding port 41. The transfer unit 48 includes a pickup roller 22, a separation roller 23, and a retard roller 24. The pickup roller 22 transfers the document 14 to the document feeding port 41 by contacting an upper surface of a topmost document 14 stacked on the document tray 11. The separation roller 23 is disposed on a downstream side of the pickup roller 22 in a document transportation direction. The retard roller 24 is disposed opposite the separation roller 23.

A guide rail (not illustrated) is vertically provided at an appropriate position of the image scanner 10, and a lifting and lowering frame 35 is able to be lifted and lowered along the guide rail. Because the document tray 11 is attached to the lifting and lowering frame 35, the document tray 11 can be vertically moved along with the lifting and lowering frame 35.

A lower limit position (illustrated in FIG. 1) of a lifting and lowering stroke of the document tray 11 is a document setting position where the documents are placed on the document tray 11. On the other hand, a position (illustrated in FIG. 3) which is located above the document setting position and in which the topmost document 14 can contact the pickup roller 22 is a separation position where the documents 14 can individually be separated by the transfer unit 48 and fed toward the document transportation path 21.

As illustrated in FIG. 1 for example, the document transportation device 47 includes a lifting and lowering device 49 which can lift and lower the document tray 11. The lifting and lowering device 49 includes a tray lifting and lowering motor 15 in the form of an electric motor, a pinion gear 13 driven by the tray lifting and lowering motor 15, and a rack 12 engaging the pinion 13. The tray lifting and lowering motor 15 is preferably a stepping motor.

The rack 12 is fixed to the lifting and lowering frame 35, and the rack 12 is vertically moved along with the lifting and lowering frame 35 and the document tray 11.

The pickup roller 22 is arranged above the document tray 11 so as to face the document tray 11, and the pickup roller 22 is supported while being able to be lifted and lowered. The pickup roller 22 is biased downward by a spring (not illustrated) such that the pickup roller 22 can be pressed against the upper surface of the topmost document 14.

A height detection sensor 31 arranged to detect a height of the pickup roller 22 is provided in the transfer unit 48. In the state in which the pickup roller 22 contacts the topmost stacked document 14, the height of the pickup roller 22 can be detected by the height detection sensor 31 to detect the height of the upper surface (upper surface height) of the stacked documents 14.

For example, the height detection sensor 31 may be a photosensor. The height detection sensor 31 is turned on when the height of the pickup roller 22 (upper surface height of the topmost document 14) exceeds a predetermined height, and the height detection sensor 31 is turned off when the height of the pickup roller 22 is lower than the predetermined height. The predetermined height is set to be a height at which the pickup roller 22 is slightly elevated by the upper surface of the topmost document 14. As illustrated in FIG. 2, the height detection sensor 31 is electrically connected to a control unit 60, which is described later, so that the height detection sensor 31 can transmit a signal of the on/off state to the control unit 60.

As illustrated in FIG. 1, a retracting solenoid 33 is coupled to the pickup roller 22, and the pickup roller 22 can be retracted upward at an appropriate timing and forcibly separated from the upper surface of the document 14. As illustrated in FIG. 2, the retracting solenoid 33 is connected to the control unit 60.

The pickup roller 22, the separation roller 23, and the retard roller 24 are coupled to an electric motor which is the driving source of the document transportation device 47 through an electromagnetic clutch 34. The electromagnetic clutch 34 is electrically connected to the control unit 60.

As illustrated in FIG. 1, a document passing detection sensor 32 including a photosensor is disposed on the downstream side of the separation roller 23 in the document transportation direction. The document passing detection sensor 32 is turned on when detecting the document immediately after the document passes through a nip position between the separation roller 23 and the retard roller 24, and the document passing detection sensor 32 is turned off in other cases. As illustrated in FIG. 2, the document passing detection sensor 32 is electrically connected to the control unit 60.

The image scanner 10 preferably includes a microcomputer type control unit 60. As illustrated in FIG. 2, the tray lifting and lowering motor 15 and the operation panel 50 and the like are electrically connected to the control unit 60.

In the image scanner 10 having the above-described configuration, an operator places the document tray 11 at the document setting position to stack the overlapped documents 14 on the document tray 11 as illustrated in FIG. 1, and the operator provides the operation panel 50 (or personal computer) an instruction to start the scanning, thereby transmitting a scanning start signal to the control unit 60.

When the control unit 60 receives the scanning start signal, the control unit 60 turns off the retracting solenoid 33 to lower the pickup roller 22, and starts the driving of the tray lifting and lowering motor 15. Therefore, the tray lifting and lowering motor 15 is driven to rotate the pinion 13, and an upward force acts on the rack 12 arranged to be engaged with the pinion 13. This enables the document tray 11 to be elevated along the guide rail from the document setting position.

The control unit 60 monitors the state of the height detection sensor 31 during the driving of the tray lifting and lowering motor 15. The upper surface of the document 14 elevated by the document tray 11 contacts with and elevates the pickup roller 22. The control unit 60 transmits a driving pulse to the tray lifting and lowering motor 15 to elevate the document tray 11 until the pickup roller 22 reaches a predetermined height to turn on the height detection sensor 31. Even after the height detection sensor 31 is turned on, the control unit 60 further drives the tray lifting and lowering motor 15 until the document tray 11 is further elevated by a predetermined height. The control unit 60 can control each predetermined height elevation of the document tray 11 by transmitting a predetermined number of driving pulses to the tray lifting and lowering motor 15, which is preferably a stepping motor.

After the document tray 11 is elevated to the separation position illustrated in FIG. 3, the tray lifting and lowering motor 15 is stopped to immediately start the driving of the transfer unit 48. Specifically, the control unit 60 connects the electromagnetic clutch 34 (FIG. 2) to start the driving of the pickup roller 22, separation roller 23, and retard roller 24. Then, the pickup roller 22 transfers the topmost document 14 as illustrated in FIG. 3, and the document 14 is fed to the document transportation path 21 through the document feeding port 41 while the separation roller 23 and the retard roller 24 separate the documents 14 one by one.

In feeding the document 14, the control unit 60 monitors the state of the document passing detection sensor 32. When the document passing detection sensor 32 detects that the topmost document 14 is fed to the downstream side by the separation roller 23 and the retard roller 24, the control unit 60 turns on the retracting solenoid 33 to retract the pickup roller 22 upward as illustrated in FIG. 4. Therefore, a subsequent document 14 can be prevented from being transferred continuously and irregularly following the previous document 14.

The transportation rollers 25 to 29 (FIG. 1) transport the document 14 through the document transportation path 21, and the image sensors 51 and 52 scan the front and back of the document 14. An appropriate conversion process is performed to the data obtained by the scanning, and the converted data is transmitted through a communication cable (not illustrated) to a personal computer or the like which is a higher order apparatus connected to the image scanner 10. The scanned document 14 is delivered along the document transportation path 21 to the discharge tray 20.

The control unit 60 measures an elapsed time using a timer circuit (not illustrated) since the document passing detection sensor 32 is turned on by detecting the document 14. When a predetermined time elapses, it is assumed that the document 14 has passed through the nip portion between the separation roller 23 and the retard roller 24 and is retained by the transportation roller 25 or the like on the downstream side. Therefore, the control unit 60 releases the connection of the electromagnetic clutch 34 to stop the driving of the pickup roller 22, separation roller 23, and retard roller 24 as illustrated in FIG. 5. The control unit 60 turns off the retracting solenoid 33 immediately after stopping the driving of the pickup roller 22, separation roller 23, and retard roller 24, and the control unit 60 lowers the pickup roller 22 to bring the pickup roller 22 into contact with the topmost document 14.

Then, the control unit 60 monitors the state of the document passing detection sensor 32. After the transferred document 14 passes through the document passing detection sensor 32, and when a predetermined time elapses since the document passing detection sensor 32 is turned off, the control unit 60 connects the electromagnetic clutch 34 again as illustrated in FIG. 3, and the control unit 60 transfers the next document 14 using the pickup roller 22. While a constant interval is ensured between the document 14 and the subsequent document 14, the documents 14 are supplied one by one to the document transportation path 21 by the repetition of the operations (FIGS. 3 to 5) until all documents 14 placed on the document tray 11 are transferred, and the documents 14 can be scanned using the image scanning unit 46.

When the documents 14 on the document tray 11 are sequentially delivered by the transfer unit 48, a remaining amount of documents 14 is gradually decreased which lowers the upper surface height of the topmost document 14. In the present preferred embodiment, by the following the control of the tray elevation, the state in which the pickup roller 22 can transfer the topmost document 14 is maintained irrespective of the remaining amount of documents 14, and the documents 14 can be sequentially transported until all of the documents 14 placed on the document tray 11 are gone.

The control of the elevation of the document tray 11 will be described in detail with reference to FIGS. 7 and 8. As illustrated in the flowchart of FIG. 7, when the document scanning is started, the document tray 11 is elevated to the separation position as described above, and the one document 14 is transferred (S101) The transfer operation is described above with reference to FIGS. 3 to 5. In the state of FIG. 5, the state of the height detection sensor 31 is checked in each transfer of the one document at the time (hereinafter referred to as "inter-transfer time") until the transfer of the next document is started since the transfer of the previous document is completed (S102 of FIG. 7). In the case where the height detection sensor 31 is turned on, i.e., the upper surface height of the topmost document 14 has not been lowered very much, the flow returns to step S101 to repeat the transfer of the document 14 one by one.

In the case where the height detection sensor 31 is turned off, a scanning speed at which the operator instructs the image scanner 10 to scan the document is checked in S103. The scanning speed is determined according to the scanning mode instructed by the operator using the operation panel 50 or the like. The scanning speed becomes a low speed in the case of the high resolution mode, the scanning speed becomes an intermediate speed in the case of the intermediate resolution mode, and the scanning speed becomes a fast speed in the case of the low resolution mode.

In the case of the high resolution mode (low scanning speed), the tray lifting and lowering motor 15 is immediately driven from the state of FIG. 5 to start the elevation of the document tray 11 (S104 of FIG. 7). The document tray 11 is elevated until the height detection sensor 31 is turned from off to on (S105). Even after the height detection sensor 31 is turned on, the document tray 11 is further elevated to a height higher by a predetermined distance (a predetermined number of pulses) than the position where the height detection sensor 31 is initially turned on, as illustrated in FIG. 6 (S106 of FIG. 7). When the document tray 11 reaches the height, the tray lifting and lowering motor 15 is stopped to stop the document tray 11 (S107), and the flow returns to step S101 to start the transfer of the next document 14.

That is, in the high resolution mode with the low scanning speed, a certain time can be ensured until the subsequent document 14 is transferred since the transfer of the document 14 is ended. Therefore, through the control steps of S104 to S107, the control unit 60 elevates the document tray 11 all at once to the necessary height during the one inter-transfer time.

On the other hand, when the determination that the scanning mode is not the high resolution mode (low scanning speed) is made in S103, it is further checked whether or not the scanning mode is the low resolution mode (S108). When the determination that the scanning mode is not the low resolution mode is made in S108, the scanning mode is determined to be the intermediate resolution mode, and the control unit 60 carries out the steps from S109.

In the intermediate resolution mode (intermediate scanning speed), the tray lifting and lowering motor 15 is immediately driven from the state of FIG. 5. However, the elevating distance is a distance corresponding to the predetermined number of pulses of the tray lifting and lowering motor 15 regardless of the position of the document tray 11 (S109). Hereinafter the elevating distance is referred to as "elevating pitch".

The elevating pitch is determined such that the elevating pitch is smaller than a distance in which the document tray 11 is elevated in one step or all at one time by the control described in the steps of S104 to S107, while the elevating pitch is larger than a thickness of one document 14. The elevating pitch is also determined such that the elevating pitch is shortened in the case where the instruction of the high speed scanning is given in the intermediate resolution mode, otherwise the elevating pitch is relatively lengthened.

After the document tray 11 is elevated by the elevating pitch in step S109, the transfer unit 48 transfers one document in step S110. Because the amount of elevation of the document tray 11 in step S109 is only the elevating pitch, the document tray 11 can securely be elevated and stopped even in the short inter-transfer time until the subsequent document 14 is further transferred since the document 14 is transferred at the intermediate speed scanning. Accordingly, because the subsequent document 14 can be transferred while the document tray 11 is completely stopped (S110), the fluctuation in document transportation can be avoided in scanning the document 14 to prevent the deterioration of the scanning image quality.

After the one document 14 is transferred in step S110, the state of the height detection sensor 31 is checked (S111). When the height detection sensor 31 is turned off, the flow returns to step S109 to repeat the elevation of the document tray 11 by the elevating pitch and the transfer of the document (S109 and S110).

As described above, when one document 14 is transferred (S109 to S111), the stacked height of the documents 14 is decreased by one sheet of the documents 14, and the document tray 11 is elevated by the elevating pitch larger than the thickness of the one sheet of the documents 14. Accordingly, when the transfer of a document 14 is repeated, the upper surface height of the topmost document 14 is gradually elevated. When the pickup roller 22 is elevated by elevating the upper surface height of the topmost document 14 to turn on the height detection sensor 31, the flow leaves the loop of steps S109 to S111 to go to the steps from S112.

In S112, a distance (additional elevating distance) in which the document tray 11 should be additionally elevated since the height detection sensor 31 is turned on is firstly set, and the additional elevating distance is stored in a memory. An initial value of the additional elevating distance is equal to a distance (target elevating distance) by which the upper surface height of the document 14 should further be elevated since the height detection sensor 31 is turned on. The additional elevating distance is also set equal to the predetermined distance by which the document tray 11 is elevated by the control of step S106 in the low speed scanning.

Then, the tray lifting and lowering motor 15 is driven to elevate the document tray 11 by the elevating pitch, and the document tray 11 is stopped (S113). Similarly to step S109, the document tray 11 is elevated and stopped during the short inter-transfer time until the subsequent document 14 is further transferred since the document 14 is transferred at the intermediate speed scanning. The elevating pitch is the same distance as that of step S109.

The total distance by which the document tray 11 is elevated since the time of S111 is computed, and it is checked whether or not the obtained total distance reaches the additional elevating distance (S114). When the total distance does not reach the additional elevating distance, the one subsequent document 14 is transferred (S115). The distance corresponding to the thickness of the one document 14 is added to the additional elevating distance, and the result is re-stored in the memory (S116). Then the flow returns to step S113.

The document tray 11 is elevated by elevating pitches in each transfer of one document 14 by the loop of steps S113 to S116, and the thickness of the one document is added to the additional elevating distance. This corresponds to re-computation of the additional elevating distance of the document tray 11 in consideration of the decrease in the upper surface height by the transfer of the document 14. While the additional elevating distance is re-computed every time the transfer of the document and the document tray is elevated, it is determined whether or not the total elevating distance of the document tray 11 reaches the additional elevating distance (S114). When the total elevating distance of the document tray 11 reaches the additional elevating distance in step S114, because the upper surface height of the document 14 is substantially elevated by the target elevating distance, the flow leaves the loop to return to step S101, and the document 14 is transferred again while the document tray 11 is stopped.

On the other hand, when the determination that the scanning mode is the low resolution mode is made in S108, the control unit 60 makes a transition to steps from S117 (FIG. 8). As illustrated in FIG. 8, in the low resolution mode (high speed scanning mode), the transfer of the document 14 performed by the transfer unit 48 is tentatively interrupted (S117). Accordingly, after the tentative interruption, the control is performed such that the operation of the pickup roller 22 of the transfer unit 48 is forbidden even at the time when the next document 14 should be transferred since the transfer of the previous document 14 is completed.

After the transfer is tentatively interrupted, the control unit 60 immediately drives the tray lifting and lowering motor 15 to start the elevation of the document tray 11 (S118). While the document tray 11 is elevated until the height detection sensor 31 is turned from off to on (S119), the document tray 11 is elevated to the height higher by the predetermined distance (the predetermined number of pulses) (S120) even after the height detection sensor 31 is turned on. When the document tray 11 reaches the height, the tray lifting and lowering motor 15 is stopped to stop the document tray 11 (S121). The steps of S118 to S121 are similar to the steps of S104 to S107 illustrated in FIG. 7.

After the document tray 11 is elevated in such a manner, the control unit 60 releases the tentative interruption of the transfer of the document (S122), then the flow returns to step S101 of FIG. 7, and the transfer of the document is resumed one by one with the document tray 11 kept stationary.

That is, in the low resolution mode with the high scanning speed, because of the significantly short inter-transfer time of the document 14, even if the one-time elevating distance is limited to the predetermined pitch as in steps S109 or S113, the time necessary for the elevation of the document tray 11 does not fall within an interval between transfers of each document 14. In the present preferred embodiment, in the low resolution mode, after the control unit 60 tentatively interrupts the transfer of the document 14, the control unit 60 elevates the document tray 11 all at once to the proper height, and the control unit 60 releases the tentative interruption to resume the transfer of the document (S117 to S122). Therefore, while the time in which the document tray 11 is elevated can be ensured, the document tray 11 is elevated one time per one-time tentative interruption, so that the frequent interruption of the transfer can be avoided to enhance scanning efficiency.

Thus, the image scanner 10 of the present preferred embodiment includes the document tray 11 on which the plural overlapped documents 14 are placed, the image scanning unit 46 which scans the document 14, the transfer unit 48 which transfers the document 14 on the document tray 11 one by one toward the image scanning unit 46, the lifting and lowering device 49 which lifts and lowers the document tray 11, the height detection sensor 31 which detects the upper surface height of the documents 14 stacked on the document tray 11, and the control unit 60 which controls the lifting and lowering device 49.

The transfer unit 48 transfers the document 14 to lower the upper surface height of the topmost document 14, and the control unit 60 performs different processes according to the scanning speed of the document 14 (transfer speed by transfer unit 48), i.e., the low scanning speed, the intermediate scanning speed, and the fast scanning speed, when the height detection sensor 31 is turned off (S103 of FIG. 7).

Specifically, in the low speed scanning (high resolution mode) of the document 14, the document tray 11 is elevated in one step until the upper surface height reaches the further height (target height) that is increased in height by the predetermined distance than the height at which the height detection sensor 31 is turned on during the inter-transfer time until the transfer of the next document 14 is started since the transfer of the document 14 is completed (S104 to S107).

On the other hand, in the intermediate speed scanning (intermediate resolution mode), the document tray 11 is elevated at predetermined elevating pitches in each transfer of one document 14 during the inter-transfer time until the upper surface height reaches the target height (S109 to S116).

In the high speed scanning (low resolution mode), the transfer of the document 14 by the transfer unit 48 is tentatively interrupted (S117 of FIG. 8), the document tray 11 is elevated until the upper surface height reaches the target height (S119 to S121), and then the transfer of the document 14 by the transfer unit 48 is resumed (S122).

Therefore, in each case of the low, intermediate, and fast document scanning speeds, the document tray 11 is elevated at an interval between transfers of each document 14. Accordingly, in scanning the image with the image scanning unit 46, the document tray 11 is kept stationary to prevent deterioration of the scanning image quality caused by the fluctuation in transportation of the document 14. In the intermediate document scanning speed, the document tray 11 is not elevated in only one step or all at once, but the document tray 11 is elevated at relatively short predetermined elevating pitches (little by little), so that the document tray 11 can naturally be elevated while making use of the short inter-transfer time, without interrupting the transfer of the document. In the fast document scanning speed, the transfer of the document is tentatively interrupted to elevate the document tray 11, and then the transfer of the document 14 is resumed, so that the document tray can surely be elevated. Because the document tray 11 is elevated one time while the transfer of the document is tentatively interrupted, the decrease in scanning efficiency caused by the transfer interruption can be minimized to a low level.

In the present preferred embodiment, during the intermediate speed scanning (intermediate resolution mode) of the document 14, when the height detection sensor 31 is turned off, the control unit 60 elevates the document tray 11 at predetermined elevating pitches in each transfer of one document 14 at the inter-transfer time until the height detection sensor 31 is turned on (S109 to S111). When the height detection sensor 31 is turned on, the control unit 60 elevates the document tray 11 at only predetermined elevating pitches in each transfer of one document 14 at the inter-transfer time until the upper surface height is further elevated by the predetermined distance (target elevating distance) (S113). The determination whether or not the elevation of the document tray 11 at elevating pitches is ended (S114) is made not based on whether the document tray 11 is merely elevated by the target elevating distance, but based on whether the upper surface height is substantially elevated by the target elevating distance in expectation of the decrease in upper surface height caused by the transfer of the document (S116).

Therefore, in the intermediate resolution mode, even if the document tray 11 is elevated little by little in each transfer of the document 14, the topmost document 14 can be elevated substantially to the target height in consideration of the decrease in the upper surface height caused by the transfer of the document. As a result, the document 14 can be smoothly transferred using the pickup roller 22.

In the steps of S109 and S113 during the intermediate resolution mode, the elevating pitch of the document tray 11 is determined to be short as the scanning speed of the document 14 is increased.

Therefore, even if the inter-transfer time is shortened as the scanning speed of the document 14 is increased, the elevating pitch is also shortened according to the shortened inter-transfer time, so that the document tray 11 can naturally be elevated little by little.

In the present preferred embodiment, the tray lifting and lowering motor 15 which is the driving source of the lifting and lowering device 49 is provided independently of the driving source of the document transportation device 47. However, the tray lifting and lowering motor 15 may commonly be used for an electric motor of the driving source for the document transportation device 47. In this configuration, the electric motor of the document transportation device 47 and the pinion 13 are connected by a well-known clutch (for example, an electromagnetic clutch).

In this case, the simple configuration, cost reduction, weight reduction, and downsizing of the image scanner are realized. Because the document tray 11 is elevated during the inter-transfer time, a proper balance can be achieved between the transportation of the document 14 and the elevation of the document tray 11 by switching the power transmission destination of the one electric motor between the period of the transfer of the document 14 and the period of the elevation of the document tray 11.

Thus, the preferred embodiments and their modifications of the present invention are described above. Furthermore, the above configurations can be changed as follows.

In the present preferred embodiment, in step S116 of the flowchart (FIG. 7), the setting of the document tray 11 is preferably performed again by adding the distance corresponding to the thickness of the one document to the additional elevating distance. Alternatively, the distance corresponding to the thickness of the one document may be subtracted from the total elevating distance of the document tray 11 in each transfer of one document.

The height detection sensor 31 is not limited to a sensor which is turned on as long as the pickup roller 22 is not lower than the predetermined height, but a sensor which is turned off as long as the pickup roller 22 is not lower than the predetermined height may be used as the height detection sensor 31.

In the height detection sensor 31, the upper surface height of the document 14 is preferably indirectly detected by detecting the height of the pickup roller 22. Alternatively, the upper surface height of the document 14 may directly be detected.

The tray lifting and lowering motor 15 is not limited to a stepping motor, but the tray lifting and lowering motor 15 may be a servo motor.

The configuration in which the document tray is elevated is not limited to the image scanner in which the document transportation path 21 is formed in a curved shape (C-shape) as illustrated in FIG. 1. For example, the configuration in which the document tray is elevated can be applied to an image scanner, in which a horizontal document transportation path is provided and the document is fed from one side of the scanner and discharged to the opposite side. The present invention is not limited to an image scanner, but can be applied to an automatic document feeder type copying machine including a large-capacity document tray.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. An image scanning apparatus comprising:
   a document tray arranged to receive a plurality of documents;
   an image scanning unit arranged to scan the documents;
   a transfer unit arranged to transfer the documents on the document tray one by one toward the image scanning unit;
   a lifting and lowering device arranged to lift and lower the document tray;
   a height detection sensor arranged to detect an upper surface height of the documents stacked on the document tray; and
   a control unit arranged to control the lifting and lowering device; wherein
   the height detection sensor detects that the upper surface height is lower than a predetermined height due to the transfer of the document by the transfer unit such that:
   in a first case of a relatively low document scanning speed, the control unit elevates the document tray to a target height which is higher by a predetermined distance from a height during an inter-transfer time between completion of the document transfer and start of a subsequent document transfer, the height being that at which the height detection sensor detects that the upper surface height is not lower than the predetermined height;

in a second case of a relatively intermediate document scanning speed that is faster than the low document scanning speed, the control unit elevates the document tray at predetermined pitches in each transfer of one document during the inter-transfer time until the upper surface height reaches the target height; and in a third case of a relatively fast document scanning speed that is faster than the intermediate document scanning speed, the control unit tentatively interrupts the transfer of the document by the transfer unit to elevate the document tray until the upper surface height reaches the target height, and then the control unit resumes the transfer of the document by the transfer unit.

2. The image scanning apparatus according to claim 1, wherein, in the second case, the control unit elevates the document tray at the predetermined pitches in each transfer of one document during the inter-transfer time until the height detection sensor detects that the upper surface height is not lower than the predetermined height;

when the height detection sensor detects that the upper surface height is not lower than the predetermined height, the control unit elevates the document tray at the predetermined pitches in each transfer of one document during the inter-transfer time until the upper surface height is further elevated by a predetermined target elevating distance; and in a determination whether or not the upper surface height is elevated by the target elevating distance, the determination is made by adding a decrease of the upper surface height due to the transfer of the document.

3. The image scanning apparatus according to claim 2, wherein the predetermined pitch in the second case is defined so as to be shortened as the document scanning speed is increased.

4. The image scanning apparatus according to claim 3, wherein a driving source is shared by the lifting and lowering device and a document transportation device arranged to transport the documents to the image scanning unit.

5. An image scanner including the image scanning apparatus according to claim 4.

* * * * *